United States Patent [19]

Maekawa et al.

[11] 4,220,353
[45] Sep. 2, 1980

[54] SUPPORTING DEVICE FOR SEAT BELT

[75] Inventors: Naozane Maekawa, Toyokawa; Takeshi Awano, Okazaki, both of Japan

[73] Assignee: Mitsubishi Jidosha Kogyo Kabushiki Kaisha, Tokyo, Japan

[21] Appl. No.: 10,377

[22] Filed: Feb. 8, 1979

[30] Foreign Application Priority Data

Feb. 16, 1978 [JP] Japan ............................ 53-18730[U]
Jun. 7, 1978 [JP] Japan ............................ 53-78317[U]

[51] Int. Cl.³ ............................................ B60R 21/10
[52] U.S. Cl. .................................... 280/801; 280/803; 280/808
[58] Field of Search ............... 280/801, 802, 803, 808; 297/482, 483, 468, 469

[56] References Cited

U.S. PATENT DOCUMENTS

| 3,836,172 | 9/1974 | Hildebrandt | 280/801 |
| 4,040,645 | 8/1977 | Giffen et al. | 280/803 |
| 4,084,841 | 4/1978 | Hayashi et al. | 280/802 |

Primary Examiner—John J. Love
Assistant Examiner—Donn McGiehan
Attorney, Agent, or Firm—Oldham, Oldham, Hudak & Weber

[57] ABSTRACT

A supporting device for a seat belt, comprising a seat belt support member attached to a sash of a door of a vehicle, a striker provided on the sash and projecting in a direction of the width of the vehicle and a recess provided on a pillar of the vehicle. The striker enters into the recess when the door is closed, and is detained by the recess to prevent the forward movement of the support member when the seat belt is strongly pulled forwardly and the sash is deformed.

13 Claims, 8 Drawing Figures

SUPPORTING DEVICE FOR SEAT BELT

BACKGROUND OF THE INVENTION

This invention relates to an improvement of a supporting device for a seat belt for use in a motor vehicle.

Recently, there has been developed a passive seat belt in which one end of a seat belt is support by a seat at the side thereof nearer to a center of the vehicle body, while the other end is supported by a seat belt support member such as a buckle or a through ring attached to a rearward portion of a sash of a door. When the door is opened, the seal belt is drawn from a retractor associated with the seat or the door to move into an unrestraining position with respect to the passenger, so that the passenger can get into and out of the vehicle. When the door is closed, the seat belt is reeled into the retractor to restrain the upper body of the passenger sitting on the seat.

However, in such seat belt mechanism, if the seat belt support member is merely attached to the sash of the door, the sash or an attaching member for the support member is deformed when the seat belt is strongly pulled forwardly due to the forward movement of the passenger upon a collision of the vehicle. Therefore, the seat belt cannot function sufficiently to restrain the passenger.

In order to overcome the above drawback, there has been utilized a supporting device in which a striker is formed on the attaching member for attaching the seat belt support member to the sash, and a catch member is fixed to a pillar of the vehicle body and projects between the sash and the striker. When the seat belt support member is strongly pulled forwardly by the seat belt and the sash is deformed, the striker is detained by the catch member. However, in this construction, the catch member is exposed on the surface of the pillar in the open condition of the door, thus the appearance of the pillar is deteriorated. Also, this construction increases numbers of parts and numbers of assembling operations, thereby increasing substantially the manufacturing cost of the supporting device and therefore the seat belt mechanism.

SUMMARY OF THE INVENTION

An object of this invention is to provide a supporting device in which the appearance of the pillar located rearwardly of the door is not substantially deteriorated when the latter is opened and which can reduce numbers of parts and numbers of assembling operations thereby reducing the manufacturing cost.

BRIEF DESCRIPTION OF THE DRAWINGS

This invention will be explained by way of example with reference to the accompanying drawings in which.

DESCRIPTION OF THE PREFERRED EMBODIMENTS

Figure 1:
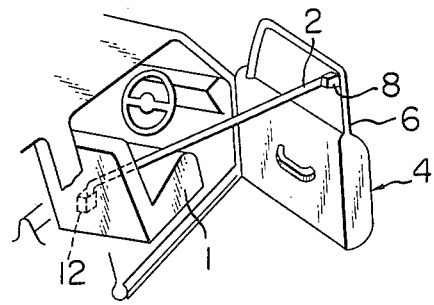
FIG. 1 is a schematic perspective view of a vehicle associated with one embodiment of the passive seat belt.

One embodiment of a passive seat belt is shown in FIG. 1. In this embodiment, the passive seat belt includes a seat belt 2 having one end held by a buckle 8 attached to a rearward portion of a sash 6 of a door 4 pivotally supported at its forward edge to a vehicle body. The other end of the seat belt 2 is reeled into a retractor 12 fixed to the seat 1 at the side thereof nearer to a center of the vehicle body.

Figure 2:
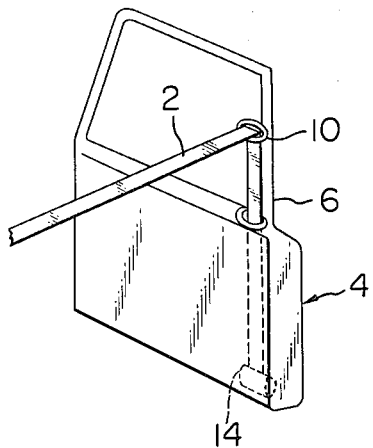
FIG. 2 is a schematic perspective view of a door of the vehicle associated with another embodiment of the passive seat belt.

In another embodiment of the passive seat belt shown in FIG. 2, one end of the seat belt 2 extends through a through ring 10 attached to the rearward portion of the sash 6 and is reeled into a retractor 14 provided in the door 4. The other end of the belt is held by the seat 1 at the side thereof nearer to the center of the vehicle body by way of any suitable means.

In both embodiments, when the door 4 is opened, the seat belt 2 is drawn from the retractor 12 or 14 to move into an unrestraining position with respect to a passenger so that the passenger can freely get into and out of the vehicle. When the door 4 is closed, the seat belt 2 is reeled back into the retractor 12 or 14 to restrain the upper body of the passenger sitting on the seat 1.

It is desirable to overcome the drawback of the above constructions that the sash 6 or an attaching member for attaching a seat belt support member 16 such as the buckle 8 or through ring 10 to the sash 6 is deformed to make the function of the seat belt 2 insufficient when the seat belt 2 is strongly pulled forwardly due to the forward movement of the passenger upon a collision of the vehicle.

Figure 3:
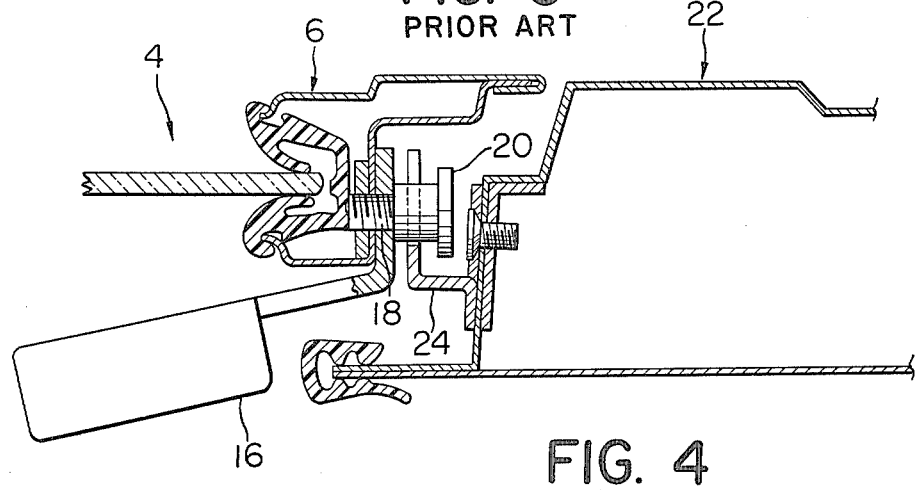
FIG. 3 is a cross-sectional view of a conventional supporting device used with the passive seat belt, showing along a horizontal plane at a connection between a seat belt support member and a sash.

To this end, in a conventional supporting device shown in FIG. 3, the attaching member 18 for attaching the seat belt support member 16 to the sash 6 is integrally formed with a striker 20. A catch member 24 is fixed to a pillar 22 of the vehicle body and has a portion projecting outwardly from the pillar 22. This portion is normally disposed between the sash 6 and the striker 20 thereon in the closed condition of the door 4. When the seat belt support member 16 is strongly pulled forwardly by the seat belt and the sash 6 is deformed in the event of a collision of the vehicle, the striker 20 is detained by the catch member 24 so that an additional deformation of the sash 6 is prevented.

The supporting device according to this invention is so designed that the appearance of the pillar in the open condition of the door is improved and numbers of parts and numbers of assembling operations are reduced.

Various embodiments of the supporting device according to the invention are now explained with reference to FIGS. 4 to 8, wherein elements substantially the same as those in the conventional supporting device shown in FIG. 3 are designated by the same numerals and not explained in detail.

Figure 4:
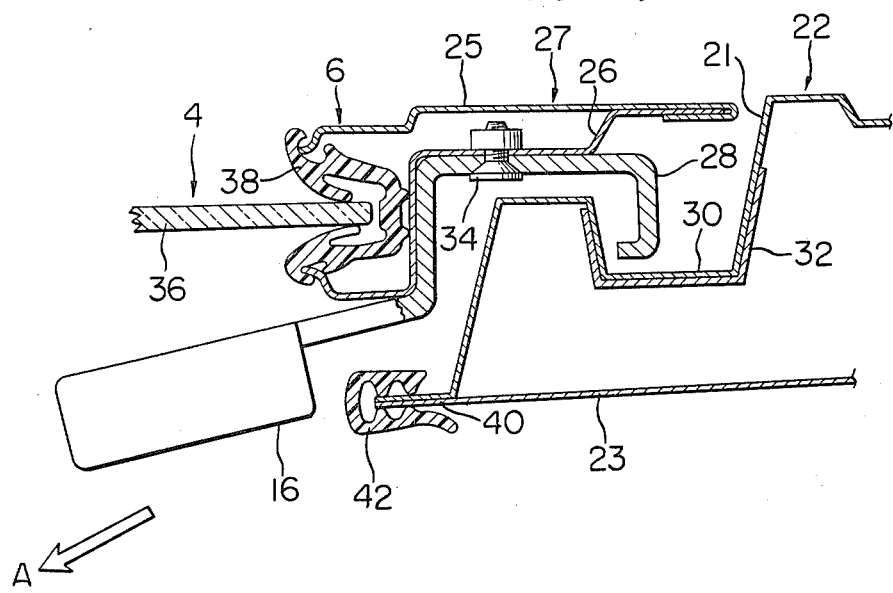
FIG. 4 is a cross-sectional view similar to FIG. 3, showing a first embodiment of the supporting device according to the invention.

In a first embodiment of the supporting device shown in FIG. 4, the sash 6 having an outer panel 25 and an inner panel 26 has a flange portion 27 which covers a portion of the pillar 22 in the closed condition of the door 4 as shown in FIG. 4. The rearward end of the seat belt support member 16 such as a retractor, anchor, through ring or buckle is integrally formed with a striker 28 which extends in a direction of the width of the vehicle and is in the form of a hook. The pillar 22 having an outer panel 21 and an inner panel 23 is provided with a recess 30 which is formed integrally with the outer panel 21 and into which the striker 28 enters when the door 4 is closed. A reinforcing member 32 is fixed on the inner surface of the outer panel 21 around the recess 30 by means of welding, riveting or any other suitable means. The support member 16 is fixed to the inner panel 26 of the sash 6 by a screw 34.

A glass runner 38 for guiding a window glass 36 is attached to the sash 6. A trim 42 is attached to a joint flange portion between the outer and inner panels 21 and 23 of the pillar 22.

According to the construction of the supporting device as described above, both the striker 28 and the recess 30 on the pillar 22 are covered by the flange portion 27 defined on the sash 6 when the door 4 is closed. If the seat belt support member 16 is strongly pulled forwardly in a direction of an arrow A by the seat belt and the sash 6 or the screw 34 is deformed in the event of a collision of the vehicle, the striker 28 is detained by the recess 30 so that the function of the seat belt is sufficiently ensured. Also, when the door 4 is opened, the recess 30 only is exposed on the outer surface of the pillar 22. Therefore, the appearance of the pillar 22 is not substantially deteriorated. Also, numbers of parts of the supporting device and numbers of assembling operations are reduced, thereby reducing the manufacturing cost.

In this embodiment, the striker 28 is integrally formed with the seat belt support member 16, but may be formed independently therefrom and fixed to the sash 6 around a connection between the support member 16 and the sash. In such case, it is necessary to rigidly fix the support member 16 to the sash 6.

Also, instead of the reinforcing member 32, a reinforcing member having a shape corresponding to the recess 30 may be fixed on the surface of the recess 30. In this case also, the appearance of the pillar 22 is not substantially deteriorated, since the pillar 22 and the reinforcing member fixed in the recess 30 integrally formed with the pillar are only visible when the door 4 is opened.

Figure 5:
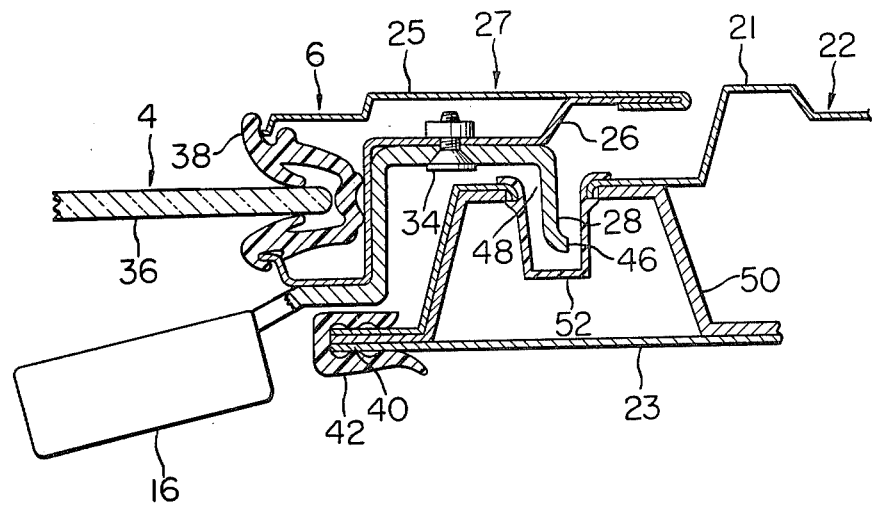
FIG. 5 is a cross-sectional view similar to FIG. 3, showing a second embodiment of the supporting device according to the invention.
Figure 6:
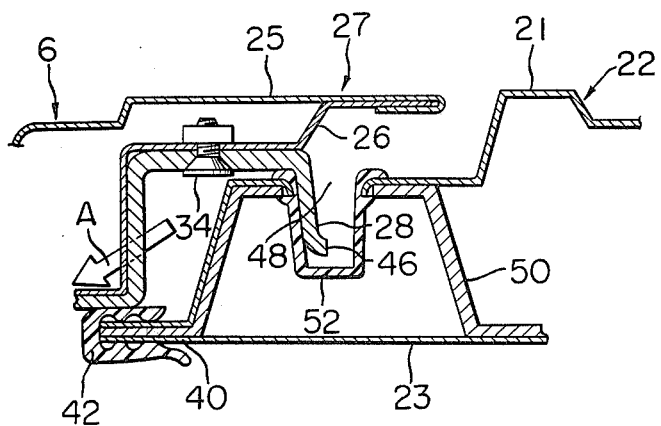
FIG. 6 is a cross-sectional view of the supporting device shown in FIG. 5, in which it is in its condition when a sash is displaced forwardly.
Figure 7:
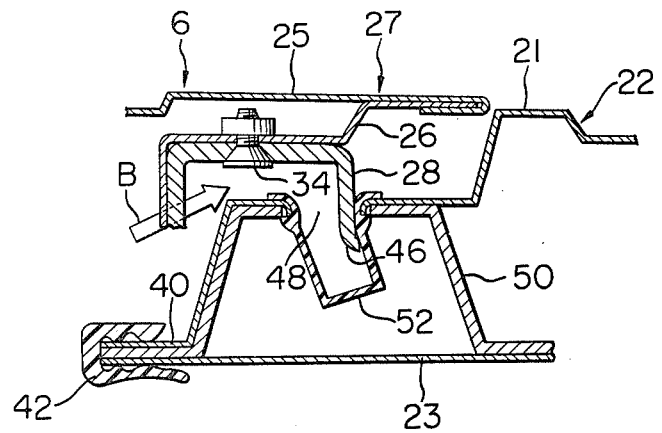
FIG. 7 is a cross-sectional view of the supporting device shown in FIG. 5, in which it is in its condition when the sash is displaced rearwardly.

A second embodiment of the supporting device according to the invention is shown in FIGS. 5 to 7 and now explained. Elements substantially the same as those in the first embodiment shown in FIG. 4 are designated by the same numerals.

In FIGS. 5 to 7, the rearward end of the seat belt support member 16 fixed to the inner panel 26 of the sash 6 by the screw 34 is integrally formed with the striker 28 which extends in a direction of the width of the vehicle. The striker 28 is preferably formed at its extremity with a projection 46 projecting rearwardly of the vehicle. The outer panel 21 of the pillar 22 is formed with an aperture 48 into which the striker 28 enters when the door 4 is closed. A reinforcing member 50 is provided in the pillar 22 and formed with an aperture which is aligned with the aperture 48 in the outer panel 21 and has a size substantially the same as that of the aperture 48. The reinforcing member 50 is welded at one side edge to the joint flange portion 40 between the outer and inner panels 21 and 23 and at the other side edge to the inner panel 23. The reinforcing member 50 and the inner panel 23 define a closed section. Edges of the aperture 48 in the outer panel 21 are bent toward the inside of the pillar 22. A cap 52 is fitted in the aperture 48 and formed preferably by an easily workable material such as synthetic resin or a sheet metal plate.

According to the construction of the supporting device as described, when the seat belt support member 16 is strongly pulled forwardly by the seat belt due to the forward movement of the passenger in the event of a collision of the vehicle and the sash 6 tends to be displaced in a direction of an arrow A as shown in FIG. 6, the striker 28 engages with the forward edge of the aperture 48, so that deformation of the sash 6 is positively prevented and the function of the seat belt is sufficiently ensured. Since the striker 28 is not provided at its forward surface with any projection, opening of the door 4 is not interfered when the door 4 is opened to rescue the passenger out of the vehicle after a collision thereof.

The cap 52 fitted in the aperture 48 only is visible on the surface of the pillar 22 when the door 4 is opened, so that the appearance of the pillar 22 is not substantially deteriorated. Also, numbers of parts of the supporting device and numbers of assembling operations are reduced. Furthermore, since the cap 52 is formed by synthetic resin or other easily workable materials, the cap is easily manufactured even if an entrance of the striker 28 into the cap 52 is relatively large.

In general, upon a collision of the vehicle, the sash 6 is displaced with the door 4 rearwardly relative to the pillar 22 in a direction of an arrow B as shown in FIG. 7, before the sash 6 is pulled forwardly by the seat belt due to the forward movement of the passenger. In this embodiment, the striker 28 is formed with the projection 46. Consequently, when the sash 6 is displaced rearwardly, the projection 46 on the striker 28 deforms the cap 52 and engages with the rearward edge of the aperture 48 to positively prevent the striker 28 from moving out of the aperture 48.

In the embodiment described above, the striker 28 is integrally formed with the seat belt support member 16, but may be formed independently therefrom and fixed to the sash 6 around a connection between the support member 16 and the sash.

In both the first and second embodiments, this invention is applied to the supporting device in which the seat belt support member 16 is fixed to the sash 6 by a screw 34, but it can be applied to a supporting device in which the seat belt support member 16 is movable relative to the sash 6 in a vertical direction. In such case, if the striker 28 is integrally formed with the seat belt support member 16, it is necessary to provide the recess 30 or the aperture 48 and cap 52 over the entire range of movement of the striker 28.

Figure 8:
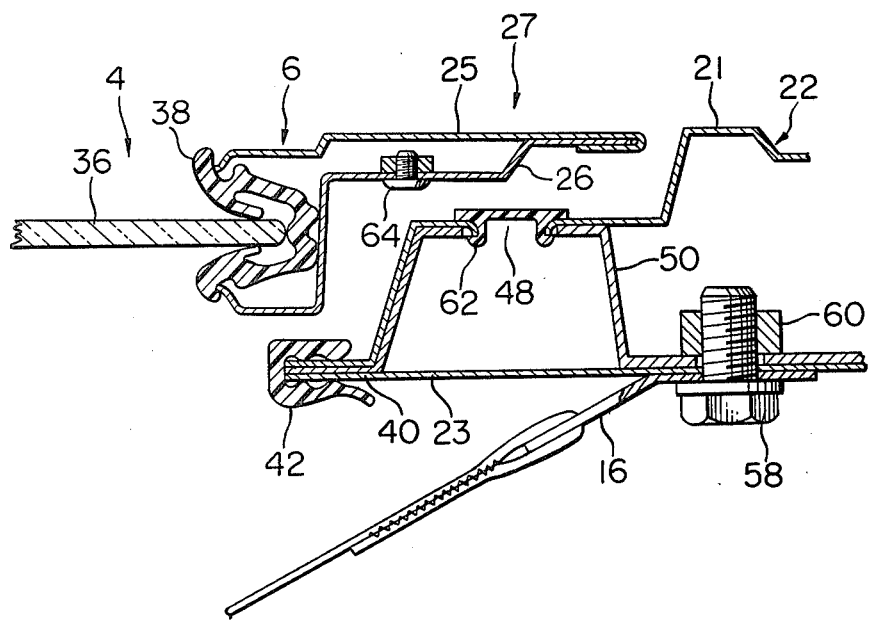
FIG. 8 is a cross-sectional view similar to FIG. 5, showing a modified application of the second embodiment.

The supporting device for the seat belt according to the invention can be modified and applied to a case that the support member 16 is adapted to be attached to the pillar 22 instead of the sash 6. In such case, as shown in FIG. 8, the rearward portion of the reinforcing member 50 is formed to extend along the inner panel 23 of the pillar 22. The seat belt support member 16 is fixed to the inner panel 23 by a bolt 58 and a nut 60. The aperture 48 is fitted with a cap 62 having an outer surface substantially on a level with the outer surface of the outer panel 21 of the pillar. An aperture, through which the screw 34 is inserted in FIG. 5, is fitted with an ornamental bolt 64 or a grommet of synthetic resin. By this construction, it is possible to obtain a vehicle construction which is associated with both of a seat belt mechanism of the type that a seat belt support member is attached to the sash 6 and of a seat belt mechanism of the type that the support member is attached to the pillar 22.

What is claimed is:

1. A supporting device for a seat belt, comprising a seat belt support member for supporting the seat belt attached to a rearward portion of a sash of a door of a vehicle, a forward edge of said door being pivotally supported by a body of the vehicle, a striker provided on the sash in the vicinity of a connection between the support member and the sash and projecting in a direction of the width of the vehicle, and a recess provided on a pillar of the vehicle body adjacent to a rearward edge of said door and defined by a wall projecting into the inside space of the pillar, said striker entering into said recess when said door is closed, said striker being detained by said wall defining said recess when said seat belt is strongly pulled forwardly and said sash is deformed, whereby said support member is prevented from moving forwardly.

2. A supporting device according to claim 1, wherein said recess is integrally formed with an outer panel constituting said pillar.

3. A supporting device according to claim 2, wherein a reinforcing member is fixed to said outer panel around said recess.

4. A supporting device according to claim 3, wherein said reinforcing member is fixed on an inner surface of said outer panel around said recess.

5. A supporting device according to claim 1, wherein said recess is defined by a cap member fitted in an aperture formed in said pillar.

6. A supporting device according to claim 5, wherein a reinforcing member is fixed to said pillar, said reinforcing member having another aperture which is aligned with said aperture in said pillar and has a size substantially the same as that of said aperture.

7. A supporting device according to claim 6, wherein said pillar having an outer panel formed with said aperture and an inner panel fixed at its side edges to said outer panel, said reinforcing member cooperating with said inner panel to define a closed section.

8. A supporting device according to claim 5, wherein said cap member is formed by synthetic resin.

9. A supporting device according to claim 5, wherein said cap member is formed by a sheet metal plate.

10. A supporting device according to claim 1, wherein said striker is integrally formed with said seat belt support member.

11. A supporting device according to claim 1, wherein said striker is provided with a projection projecting rearwardly of the vehicle.

12. A supporting device according to claim 1, wherein said sash is formed with a flange portion which is positioned outwardly of the vehicle relative to said recess formed on said pillar and is in widthwise alignment with said recess so as to cover said recess when said door is closed.

13. A supporting device according to claim 1, where said striker is of hook shape and is rigidly affixed to said seat belt support member.

* * * * *